(12) United States Patent
Sakai et al.

(10) Patent No.: US 11,001,207 B2
(45) Date of Patent: May 11, 2021

(54) LEVER SWITCH FOR VEHICLE WITH FUNCTION ASSIGNED TO OPERATION

(71) Applicant: TOYO DENSO KABUSHIKI KAISHA, Minato-ku (JP)

(72) Inventors: Naohiro Sakai, Tsurugashima (JP); Shigeharu Nezu, Tsurugashima (JP)

(73) Assignee: TOYO DENSO KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/429,916

(22) Filed: Jun. 3, 2019

(65) Prior Publication Data
US 2019/0375341 A1     Dec. 12, 2019

(30) Foreign Application Priority Data
Jun. 7, 2018   (JP) .............................. JP2018-109774

(51) Int. Cl.
*B60R 11/02*   (2006.01)
*B60S 1/08*    (2006.01)
(Continued)

(52) U.S. Cl.
CPC ............ *B60R 11/0229* (2013.01); *B60Q 1/40* (2013.01); *B60S 1/0811* (2013.01);
(Continued)

(58) Field of Classification Search
CPC .. H01H 3/00; H01H 3/04; H01H 3/46; H01H 9/16; H01H 9/161; H01H 9/165; H01H 9/18; H01H 9/181; H01H 9/185; H01H 21/18; H01H 21/22; H01H 2003/028; H01H 2003/46; H01H 2009/16; H01H 2009/161; H01H 2009/164; H01H 2009/18; H01H 2009/182; H01H 2009/186; H01H 2219/036; H01H 2219/039; H01H 2219/038; H01H 2221/00; H01H 2221/016; H01H 2231/026; H01H 25/00; H01H 25/04; H01H 89/00; B60K 20/06; B60R 2011/001; B60R 2011/0294; B60R 2011/008; B60R 2011/0085; B60R 2011/0042; B60R 2300/8093; B60R 1/04; B60R 1/1207; B60R 11/0229; B60R 11/0235; B60R 16/00; B60R 16/02; B60Q 1/00; B60Q 1/0017; B60Q 1/40; B60Q 1/0811; B60Q 1/1453; B60Q 1/1469; B60Q 1/34; B60Q 1/343; B60Q 1/1461;
(Continued)

(56) References Cited

U.S. PATENT DOCUMENTS

2016/0043348 A1* 2/2016 Zhang ................ H01L 27/3246
                                                      257/40
2018/0086206 A1* 3/2018 Mizuno .............. B60Q 1/1469

FOREIGN PATENT DOCUMENTS

JP       2010-182569       8/2010

* cited by examiner

Primary Examiner — Anthony R Jimenez
(74) Attorney, Agent, or Firm — Cozen O'Connor

(57) ABSTRACT

A lever switch for a vehicle that enables a driver to understand a function being performed without causing driving distraction. A lever switch for a vehicle mounted on a steering column has a video display formed along a horizontal direction of the vehicle, in which the video display displays a function assigned to an operation of the lever switch for a vehicle, for example, lighting of a turn signal by moving a light spot on the video display from left to right or right to left.

15 Claims, 12 Drawing Sheets

(51) Int. Cl.
 *B60Q 1/40* (2006.01)
 *B60R 11/00* (2006.01)
(52) U.S. Cl.
 CPC . *B60R 2011/001* (2013.01); *B60R 2011/0294* (2013.01); *B60R 2300/8093* (2013.01)
(58) Field of Classification Search
 CPC ... B62D 1/00; B62D 1/02; B62D 1/12; B62D 1/14; B62D 1/16
 USPC .......................................................... 348/837
 See application file for complete search history.

LEVER SWITCH FOR VEHICLE WITH FUNCTION ASSIGNED TO OPERATION

BACKGROUND OF THE INVENTION

Field of the Invention

The present invention relates to a lever switch for a vehicle with functions assigned to an operation.

Description of the Related Art

In the past, a column switch mounted on a steering column of a vehicle is known. As the column switch, one which has an operation knob or a lever switch which vertically swings with the steering column as a fulcrum is used.

The lever switch vertically swings with a plurality of moderation feelings, and functions that a driver wants to demonstrate in a vehicle, for example, lighting of turn signals and a reciprocating motion of wiper blades are assigned to each moderation feeling generated position. The driver moves the lever switch to a desired moderation feeling generated position, thereby sending a command to demonstrate the assigned functions. In addition, the operation knob rotates around an axis with a plurality of moderation feelings, and the functions that the driver wants to demonstrate in the vehicle are associated with each moderation feeling generated position. The driver rotates the operation knob to a desired moderation feeling generated position, thereby sending a command to demonstrate the assigned functions.

However, since it is difficult for a driver to grasp at which position the moderation feeling generated position of the lever switch or the operation knob is positioned at first glance when the driver wants to grasp the functions that he/she is demonstrating, a lever switch device which has a display built therein and displays pattern information or character information indicating functions (intermittent operation of wipers, and the like) according to an rotation angle of the operation knob (see, for example, Japanese Laid-open Patent Publication No. 2010-182569) has been proposed.

In recent years, in order to improve safety of a vehicle while driving, a large amount of information on an instrument panel or a windshield of the vehicle, for example, distance information with a preceding vehicle, a warning of abnormal driving, or a warning of a following vehicle are displayed. Therefore, if information related to the functions assigned to the operation of the lever switch or the operation knob as well as the large amount of information are displayed, the driver may be confused. In particular, the driver's attention is required in interpreting the pattern information and the character information displayed in Japanese Laid-open Patent Publication No. 2010-182569, which may interfere with the driver's driving.

SUMMARY OF THE INVENTION

The present invention provides a lever switch for a vehicle capable of grasping a content of functions that a driver is demonstrating without causing any troubles in driving.

According to an aspect of the present invention, there is provided a lever switch for a vehicle mounted on a steering column of the vehicle, comprising a main body, a lever connecting between the main body and the steering column, the main body at least accepts an operation, and the main body has a display which displays that a function assigned to the operation is demonstrated through displaying a changing displayed object.

According to the present invention, it enables to grasp the functions that the driver is demonstrating without causing any troubles in driving. In addition, according to the present invention, it also enables to secure redundancy for the change in the function assigned to the operation of the lever switch for a vehicle.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. However, the configurations described in the following embodiments are merely illustrative, and the scope of the present invention is not limited to the configurations described in the embodiments.

Figure 1:
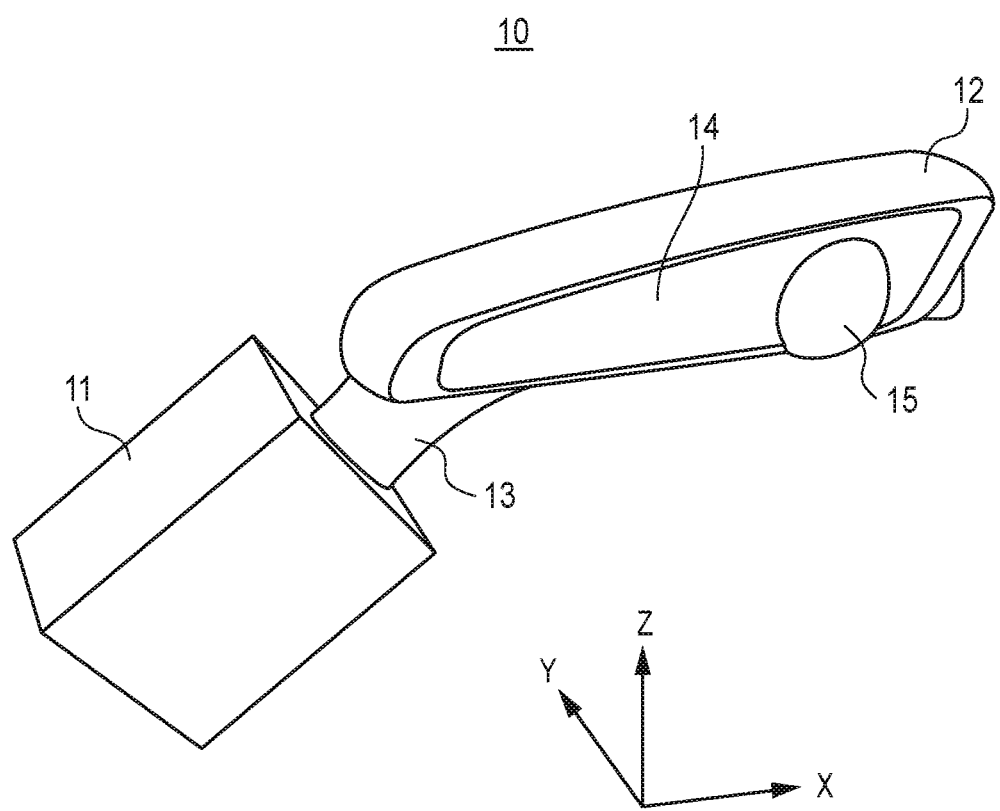
FIG. 1 is a perspective view schematically showing a configuration of a right lever switch for a vehicle according to an embodiment of the present invention.

FIG. 1 is a perspective view schematically showing a configuration of a right lever switch for a vehicle according to an embodiment of the present invention. A Y direction in FIG. 1 indicates a traveling direction of the vehicle, an X direction indicates a left and right direction of the vehicle, and a Z direction indicates a vertical direction of the vehicle.

In FIG. 1, a lever switch 10 for a vehicle includes a base portion 11 embedded in a steering column, a substantially housing-like main body 12 extending in the X direction, and a lever 13 connecting between the base portion 11 and the main body 12. The lever switch 10 for a vehicle is configured to be vertically swingable with respect to the steering column with a plurality of moderation feelings with the base portion 11 as a fulcrum, and functions that a driver wants to demonstrate in the vehicle, such as lighting of a turn signal and a reciprocating motion of wipers are assigned to each moderation feeling generated position.

It should be noted that the lever 13 may be fixed to the steering column, and the main body 12 may be configured to be vertically swingable with respect to the lever 13 with a plurality of moderation feelings. Even in this case, the functions that the driver wants to demonstrate in the vehicle are assigned to each moderation feeling generated position.

The main body 12 has a video display 14 horizontally formed along the X direction and a push-button switch 15 disposed at the right end. As the video display 14, displays which display videos by reflected light or light emission, such as a liquid crystal display or an organic electro luminescence (EL) display, may be used.

In the lever switch 10 for a vehicle, both the video display 14 and the push-button switch 15 are disposed to direct the driver. A display surface of the video display 14 appears at a driver side of the main body 12. Thereby, the driver's visibility of the displayed objects displayed on the display surface of the video display 14 is improved. Furthermore, the display surface of the video display 14 appears at the driver side of the main body 12, and it increases a displayable range of the displayed objects or the degree of freedom of the display content as compared with the conventional lever switch in which the displayed objects are projected from a built-in projector to an exterior of the lever switch and display more complex displayed objects, such as displayed objects with movements or changes. Examples of the displayed objects with movements or changes may include displayed objects with changes in moving speed, displayed objects with changes in moving direction, or displayed objects with changes in display frequency. As a result, visual information is intuitively transmitted to the driver as compared with the conventional lever switch.

In this embodiment, the exposed state of the display surface of the video display 14 or a video display 24 described later include not only a state in which the display surface of the video display 14 or the video display 24 directly appears at the driver side of main bodies 12 and 22 but also a state in which the display surface of the video display 14 or the video display 24 is covered with a thin film, for example, a permeable film on the surface of the driver side of the main bodies 12 and 22. It should be noted that details of the displayed objects on the video display 14 will be described later.

In addition, the push-button switch 15 functions as a trackball, and accepts not only a pushing down operation by the driver but also a rotation operation. For example, lighting of a headlight, lighting of a small light or passing of a headlight is assigned to each operation of the push-button switch 15. It should be noted that the functions assigned to each operation of the push-button switch 15 are not limited to the lighting of the headlight, and for example, activation of a cruise control may also be assigned to the operation of the push-button switch 15.

Figure 2:
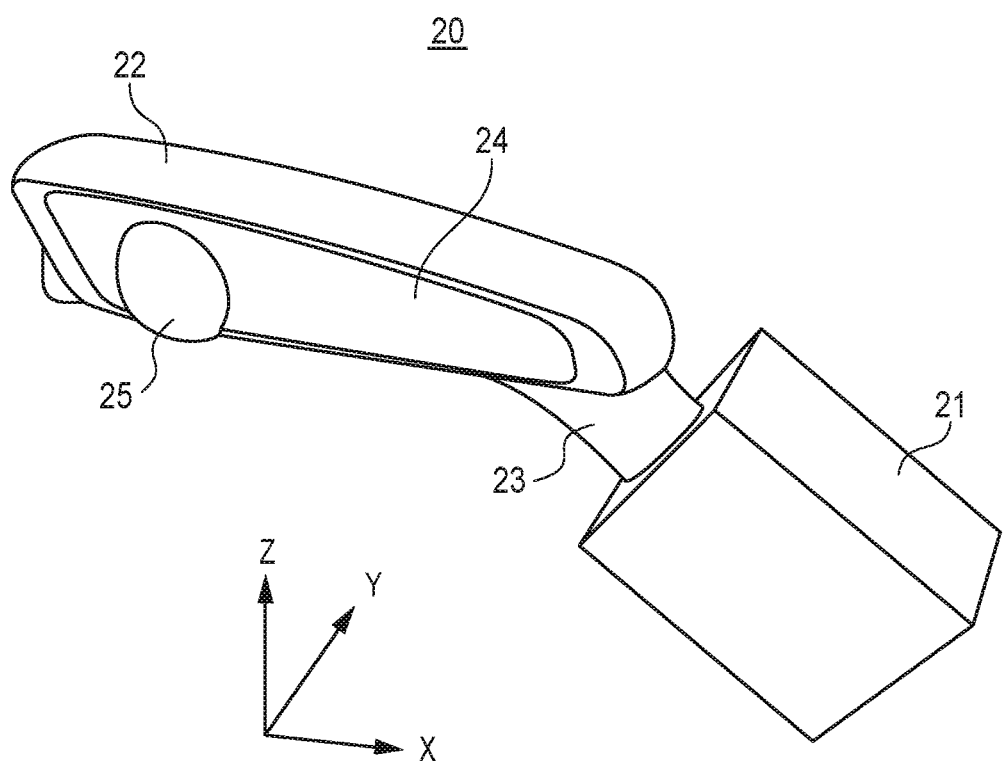
FIG. 2 is a perspective view schematically showing a configuration of a left lever switch for a vehicle according to an embodiment of the present invention.

FIG. 2 is a perspective view schematically showing a configuration of a left lever switch for a vehicle according to the present embodiment. Similarly to FIG. 1, a Y direction in FIG. 1 indicates a traveling direction of the vehicle, an X direction indicates a left and right direction of the vehicle, and a Z direction indicates a vertical direction of the vehicle.

In FIG. 2, a lever switch 20 for a vehicle has the same configuration as the lever switch 10 for a vehicle, and specifically, includes a base portion 21 embedded in a steering column, a housing-like main body 22 extending in the X direction, and a lever 23 connecting between the base portion 21 and the main body 22. The lever switch 20 for a vehicle is configured to be vertically swingable with respect to a steering column with a plurality of moderation feelings with the base portion 21 as a fulcrum, and functions that a driver wants to demonstrate in the vehicle are assigned to each moderation feeling generated position.

It should be noted that the lever 23 may be fixed to the steering column, and the main body 22 may be configured to be vertically swingable with respect to the lever 23 with a plurality of moderation feelings. Even in this case, the functions that the driver wants to demonstrate in the vehicle are assigned to each moderation feeling generated position.

The main body 22 has a video display 24 formed horizontally long along the X direction and a push-button switch 25 disposed at the left end. Similarly to the video display 14, as the video display 24, a liquid crystal display, an organic EL display or the like is used.

In the lever switch 20 for a vehicle, both the video display 24 and the push-button switch 25 are arranged to direct the driver, and the display surface of the video display 24 appears at the driver side of the main body 22. It should be noted that details of the displayed object on the video display 24 will be described later. In addition, the push-button switch 25 functions as a trackball, and accepts not only a pushing down operation by the driver but also a rotation operation. Various functions are assigned to each operation of the push-button switch 25.

In the present embodiment, each shape of the lever switch 10 for a vehicle and each shape of the lever switch 20 for a vehicle are formed in a mirror-symmetry manner, such that the uniformity of the design around the steering column is secured.

Figure 3:
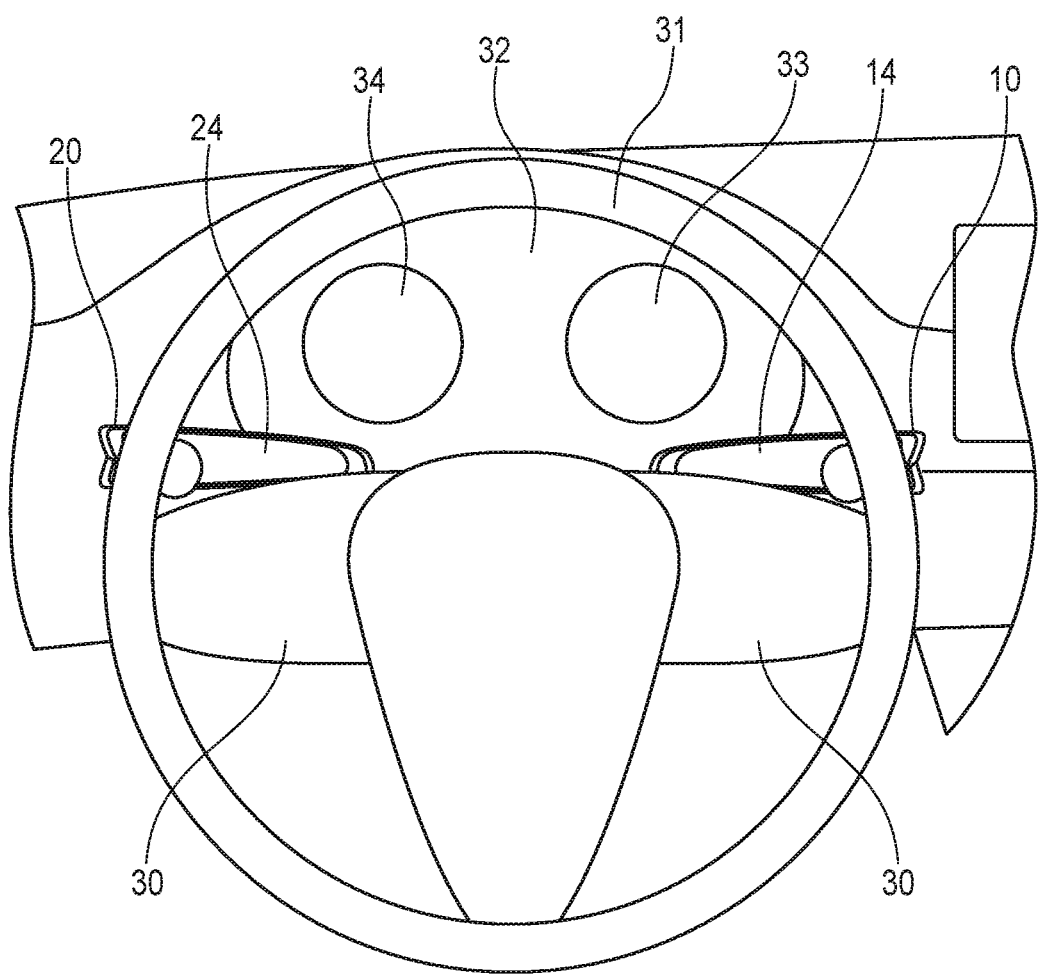
FIG. 3 is a diagram showing an arrangement form of the lever switch for a vehicle of FIG. 1 and the lever switch for a vehicle of FIG. 2 in a steering operation system.

FIG. 3 is a diagram showing an arrangement form of the lever switch 10 for a vehicle of FIG. 1 and the lever switch 20 for a vehicle of FIG. 2 in the steering operation system. FIG. 3 shows the case where a driver is looking at an instrument panel.

In FIG. 3, the steering operation system includes the steering column (not shown), a steering spoke 30 projecting leftward and rightward from the steering column, and a circular steering wheel 31 attached to each end of the steering spoke 30 substantially concentric with the steering column. In this steering operation system, the lever switch 10 for a vehicle is attached to the right side of the steering column, and the lever switch 20 for a vehicle is attached to the left side of the steering column. It should be noted that, in FIG. 3, the steering column is covered with the steering spoke 30 to be hidden. In addition, the video display 14 is inside of the steering wheel 31, and is disposed not to cover the displayed objects displayed on an instrument panel 32, for example, a speedometer 33, a tachometer 34, and other warning lights (not shown). More specifically, the video display 14 is disposed so that the video display 14 and the steering spoke 30 approach each other to such an extent that the bottom part of the video display 14 is partially covered with the steering spoke 30.

In addition, the video display 24 is inside of the steering wheel 31, and is disposed not to cover the speedometer 33, the tachometer 34 of the instrument panel 32, and other warning lights (not shown). More specifically, similarly to the video display 14, the video display 14 is disposed so that the video display 24 and the steering spoke 30 approach each other to such an extent that the bottom part of the video display 24 is partially covered with the steering spoke 30.

Figure 4A:
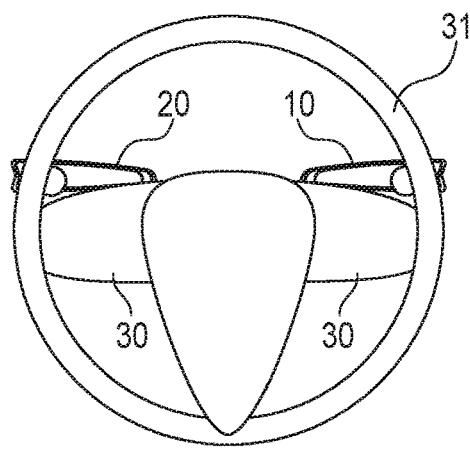
FIGS. 4A to 4E are process diagrams indicating a two-stage momentary action of each of the lever switches for a vehicle.
Figure 4B:
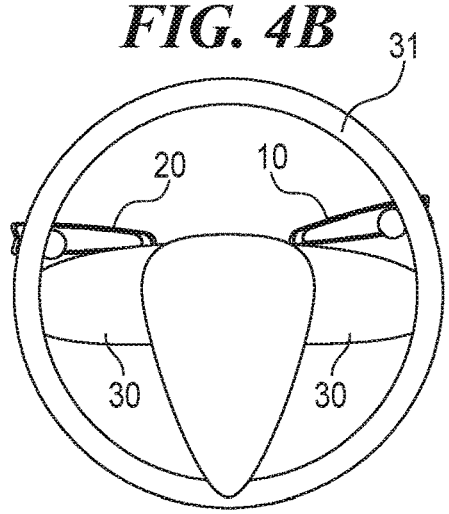
Figure 4C:
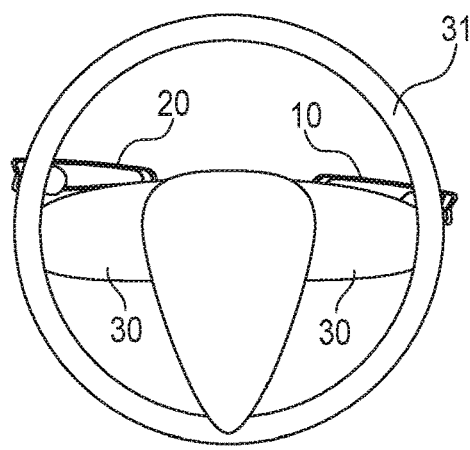

However, in the present embodiment, when the driver swings the lever switch 10 for a vehicle to the moderation feeling generated position, the lever switch 10 for a vehicle may also perform a so-called momentary action of making the lever switch for a vehicle return to its initial position without staying at the moderation feeling generated position. In the momentary action of the lever switch 10 for a vehicle, in the case where the lever switch 10 for a vehicle at its initial position as shown in FIG. 4A moves upward and swings to the moderation feeling generated position (FIG. 4B) or the lever switch 10 for a vehicle moves downward and swings to the moderation feeling generated position (FIG. 4C), when the driver's hand is released from the lever switch 10 for a vehicle, the lever switch 10 for a vehicle returns to its initial position (FIG. 4A In addition, even when the driver does not swing the lever switch 10 for a vehicle to the moderation feeling generated position, for example, but swings the lever switch 10 for a vehicle upward or downward by a small amount, the driver may also perform the momentary action of making the lever switch 10 for a vehicle return to its initial position. That is, the lever switch 10 for a vehicle may perform a two-stage momentary action.

Figure 4D:
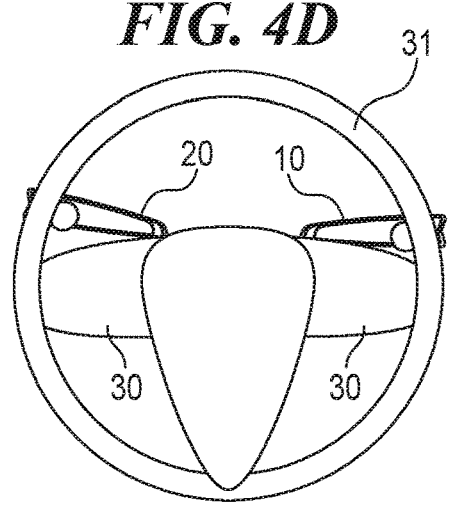
Figure 4E:
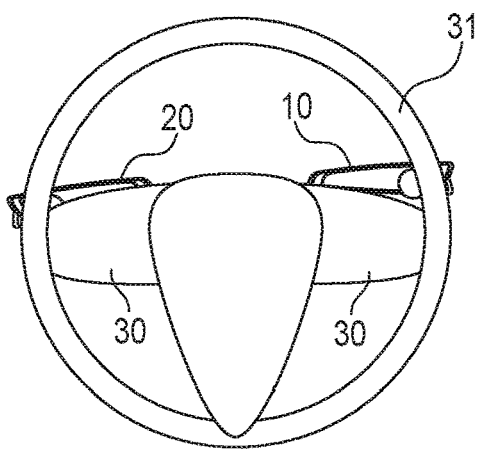

In addition, a so-called momentary action of making the lever switch 20 for a vehicle return to its initial position without staying at the moderation feeling generated position may also be performed. In the momentary action of the lever switch 20 for a vehicle, in the case where the lever switch 20 for a vehicle at its initial position as shown in FIG. 4A moves upward and swings to the moderation feeling generated position (FIG. 4D) or the lever switch 20 for a vehicle moves downward and swings to the moderation feeling generated position (FIG. 4E), when the driver's hand is released from the lever switch 20 for a vehicle, the lever switch 20 for a vehicle returns to its initial position (FIG. 4A In addition, even when the driver does not swing the lever switch 20 for a vehicle to the moderation feeling generated position, for example, but slightly swings the lever switch 20 for a vehicle upward or downward, the driver may also perform the momentary action of making the lever switch 20 for a vehicle return to its initial position. That is, the lever switch 20 for a vehicle may also perform the two-stage momentary action.

In the two-stage momentary action, when the lever switch 10 or 20 for a vehicle swings to the moderation feeling generated position, the demonstration of the assigned functions, such as the lighting of the turn signals or the reciprocating motion of the wipers are continued over a predetermined time, whereas when the lever switch 10 or 20 for a vehicle swings upward or downward by a small amount, the demonstration of the assigned functions such as the lighting of the turn signals are repeated a few times, for example, three times, or the reciprocating motion of the wipers is repeated a few times, for example, three times.

It should be noted that, in the present embodiment, the lever switch 10 for a vehicle and the lever switch 20 for a vehicle are respectively attached to the right side and left side of the steering column, but one of the lever switches 10 and 20 for a vehicle may be attached to only one of the right side and left side of the steering column.

In addition, the lighting of the turn signal and the reciprocating motion of the wipers may be assigned to the lever switch 10 for a vehicle and the lever switch 20 for a vehicle, respectively, and for example, the reciprocating motion of the wipers is assigned to the operation of the right lever switch 10 for a vehicle, and the lighting of the turn signal may be assigned to the operation of the left lever switch 20 for a vehicle.

Figure 5:
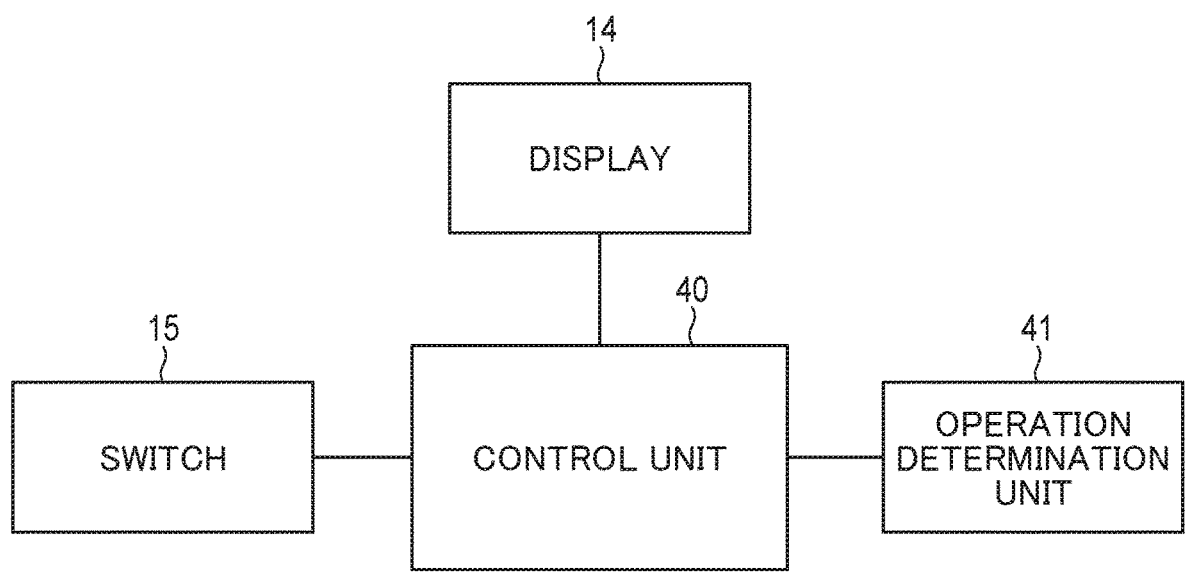
FIG. 5 is a block diagram showing a configuration for controlling a display content of a video display of the lever switch for a vehicle of FIG. 1.

FIG. 5 is a block diagram showing a configuration for controlling the display content of the video display 14 of the lever switch 10 for a vehicle of FIG. 1.

In FIG. 5, for example, a control unit 40 which is part of an ECU is connected to the video display 14 or the push-button switch 15, and is further connected to an operation determination unit 41 which determines the operation content of the lever switch 10 for a vehicle. It should be noted that the operation determination unit 41 may also be configured by part of the ECU. The operation determination unit 41 determines whether the operation of the lever switch 10 for a vehicle swings to each moderation feeling generated position or swings by a small amount and further, to which moderation feeling generated position the lever switch 10 for a vehicle swings. The control unit 40 determines the display content of the video display 14 based on the operation content of the push-button switch 15 and the operation content of the lever switch 10 for a vehicle. The video display 14 displays the displayed objects corresponding to the determination of the control unit 40. It should be noted that the control unit 40 and the operation determination unit 41 may be configured by a unique CPU instead of the ECU. In addition, since the configuration for controlling the display content of the video display 24 of the lever switch 20 for a vehicle also has the same configuration for controlling the display content of the video display 14 of the lever switch 10 for a vehicle which described above in detail, the description thereof will be omitted.

Next, the displayed object on the video display 14 and the video display 24 will be described. In the present embodiment, the case where the lighting of the turn signal is assigned to the operation of the lever switch 20 for a vehicle, and the reciprocating motion of the wipers is assigned to the operation of the lever switch 10 for a vehicle will be described.

FIGS. 6A to 6D are diagrams indicating the displayed object on the video display 24 in the case where the left lever switch 20 for a vehicle in FIG. 2 is pushed up when turning right.

Figure 6A:
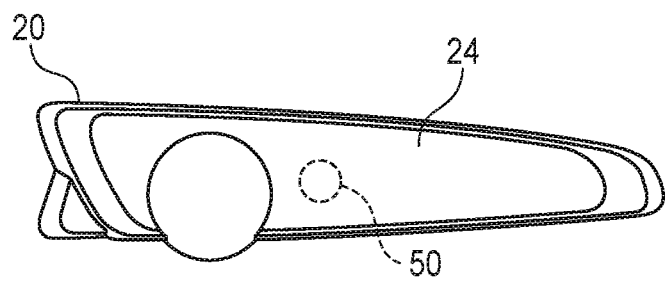
FIGS. 6A to 6D are diagrams indicating a displayed object on a video display of the lever switch for a vehicle in the case where the left lever switch for a vehicle in FIG. 2 is pushed up when turning right.
Figure 6B:
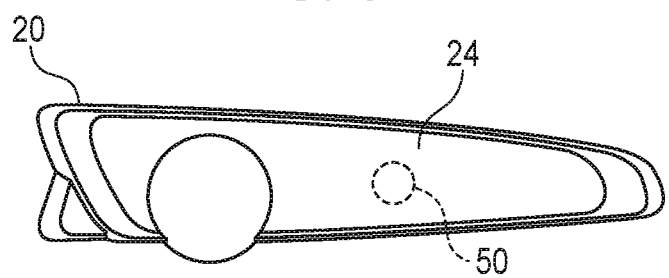
Figure 6C:
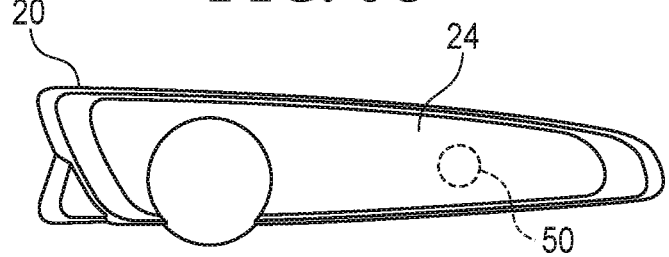
Figure 6D:
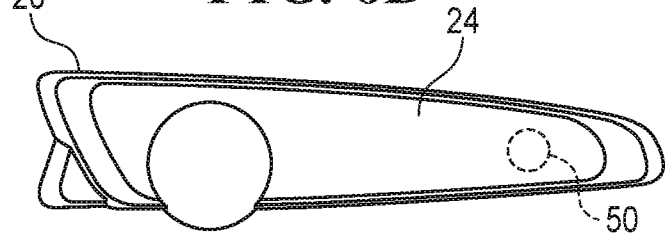

In FIGS. 6A to 6D, in the case where the driver pushes up the lever switch 20 for a vehicle and swings the lever switch 20 for a vehicle to the predetermined moderation feeling generated position when turning right, the video display 24 lights a light spot 50 near the left end of the video display 24 (FIG. 6A), and then moves the light spot 50 from left to right which is the turn direction of the vehicle as time proceeds (FIGS. 6B and 6C Thereafter, when the light spot 50 reaches near the right end of the video display 24 (FIG. 6D), the light spot 50 is once turned off, and the light spot 50 is again lighted near the left end of the video display 24, and then the operations of FIGS. 6A to 6D are repeated over the predetermined time. It should be noted that, when the lever switch 20 for a vehicle stays at a predetermined moderation feeling generated position, the movement of the light spot 50 of FIGS. 6A to 6D is repeated continuously. On the other hand, when the lever switch 20 for a vehicle swings upward by a small amount, the movement of the light spot 50 in FIGS. 6A to 6D is repeated a few times, for example, three times, and then the video display 24 ends the lighting of the light spot 50.

FIGS. 7A to 7D are diagrams indicating the displayed object on the video display 24 in the case where the left lever switch 20 for a vehicle in FIG. 2 is pushed down when turning left.

Figure 7A:
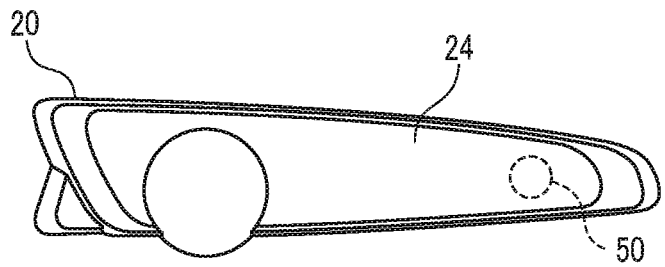
FIGS. 7A to 7D are diagrams indicating a displayed object on a video display of the lever switch for a vehicle in the case where the left lever switch for a vehicle in FIG. 2 is pushed down when turning left.
Figure 7B:
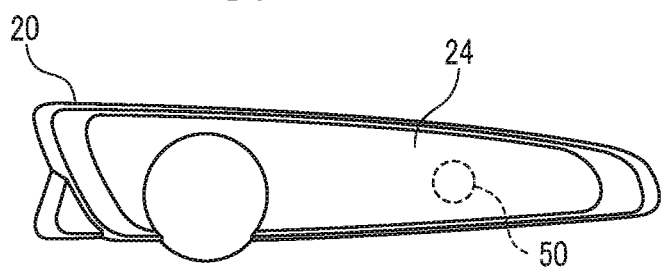
Figure 7C:
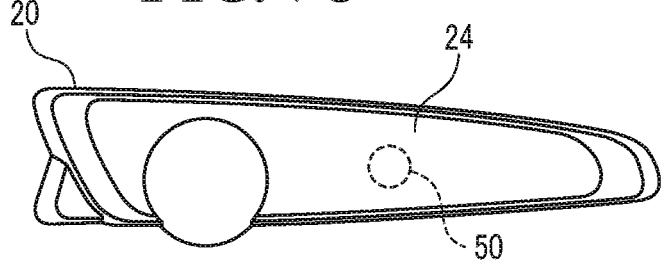
Figure 7D:
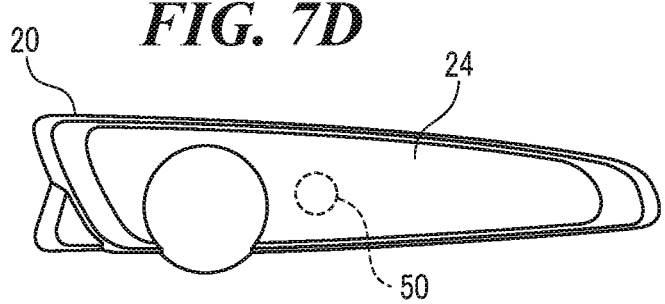

In FIGS. 7A to 7D, in the case where the driver pushes down the lever switch 20 for a vehicle and swings the lever switch 20 for a vehicle to the predetermined moderation feeling generated position when turning left, the video display 24 lights a light spot 50 near the right end of the video display 24 (FIG. 7A), and then moves the light spot 50 from right to left which is the turn direction of the vehicle as time proceeds (FIGS. 7B and 7C Thereafter, when the light spot 50 reaches near the left end of the video display 24 (FIG. 7D), the light spot 50 is once turned off, and the light spot 50 is again lighted near the right end of the video display 24, and then the operations of FIGS. 7A to 7D are repeated over the predetermined time. It should be noted that, when the lever switch 20 for a vehicle stays at a predetermined moderation feeling generated position, the movement of the light spot 50 of FIGS. 7A to 7D is repeated continuously. On the other hand, when the lever switch 20 for a vehicle swings downward by a small amount, the movement of the light spot 50 in FIGS. 7A to 7D is repeated a few times, for example, three times, and then the video display 24 ends the lighting of the light spot 50.

According to the present embodiment, since the light spot 50 moves in the turn direction of the vehicle on the video display 24, the movement of the light spot 50 represents the lighting of the turn signal in an abstract manner. Therefore, by visually observing the movement of the light spot 50, the driver can easily notice that the turn signal light is on and, further, which side is on between right and left. As a result, even when the video display 24 displays (lights) the light spot 50, the driver is not confused, understanding that the turn signal light is on, such that it enables to grasp the function that the driver is demonstrating without causing any troubles in driving.

In addition, according to the present embodiment, since the main body 12 of the lever switch 10 for a vehicle has the video display 14, even when the function assigned to the operation of the lever switch 10 for a vehicle is changed, it enables to cope with the change in the assigned functions only by changing the displayed content of the video display 14. Further, according to the present invention, it is possible to secure redundancy for the change in the function assigned to the operation of the right lever switch 10 for a vehicle. In addition, similarly, it is possible to secure the redundancy for the change in the function assigned to the operation of the left lever switch 20 for a vehicle. As a result, for example, with regard to the lighting of the turn signal which is changed whether to be assigned to the right lever switch 10 for a vehicle or to be assigned to the left lever switch 20 for a vehicle depending on the destination of the vehicle, it enables to flexibly cope with the destination for a vehicle.

In addition, according to the present embodiment, even when the functions assigned to the operation of the lever switch 10 or 20 for a vehicle are changed, it enables to cope with the change in the functions only by changing the display content of the video display 14 or 24, and as a result, for example, there is no need to change a cover on which a sign indicating the function assigned to the operation is printed. Therefore, it enables to avoid an increase in the types of lever switches for a vehicle.

In addition, in the present embodiment, the displayed object (moving light spot 50) displayed on the video display 14 (24) of the lever switch 10 (20) for a vehicle which swings (operates) by the driver is related to the function (lighting of the turn signal) assigned to the operation of the lever switch for a vehicle operated by the driver. That is, the displayed object related to the function assigned to the operation is displayed on the video display of the lever switch for a vehicle operated by the driver. Accordingly, the driver can intuitively and easily understand the function symbolized by the displayed object, and the driver will not be confused in order to understand the function. As a result, it prevents the driver from causing any troubles in driving.

Figure 8A:
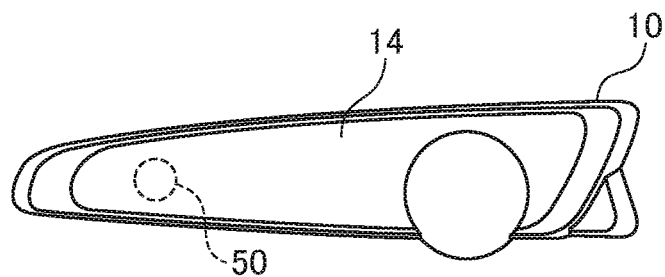
FIGS. 8A to 8D are diagrams indicating a displayed object on a video display of the right lever switch for a vehicle in the case where the left lever switch for a vehicle in FIG. 2 is pushed up when turning right.
Figure 8B:
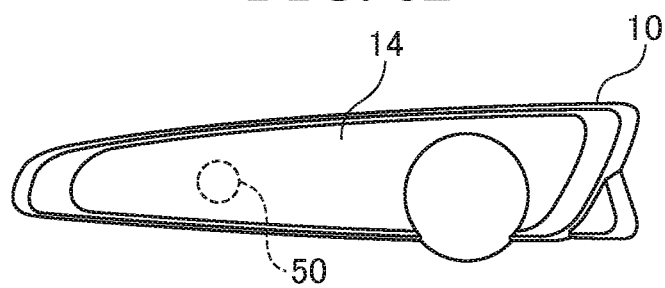
Figure 8C:
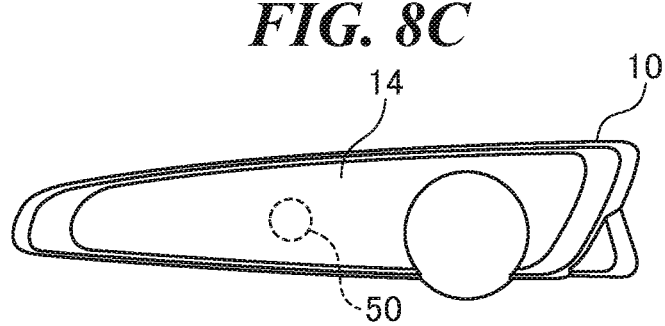
Figure 8D:
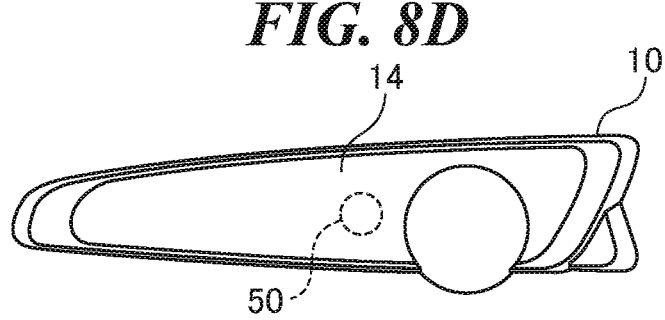
Figure 9A:
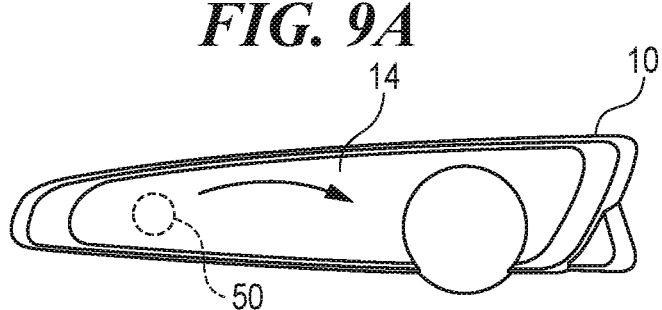
FIGS. 9A to 9D are diagrams indicating a displayed object on a video display in the case where the right lever switch for a vehicle in FIG. 1 is pushed up to perform a reciprocating motion of wipers.
Figure 9B:
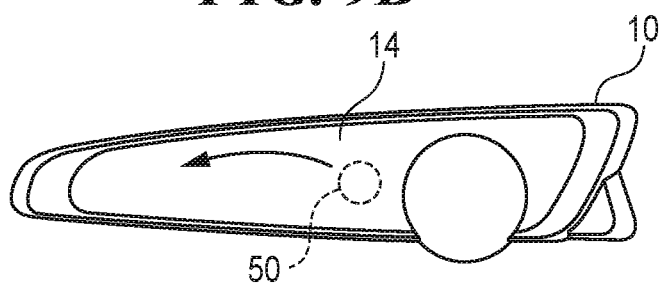
Figure 9C:
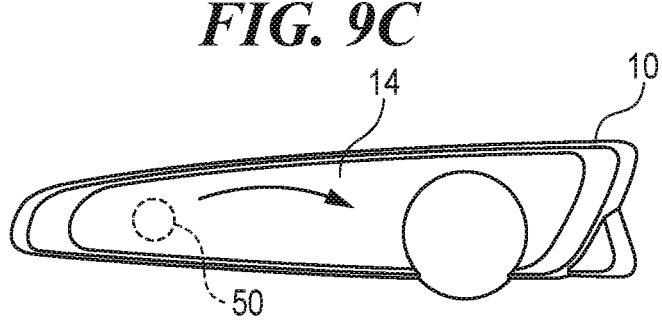
Figure 9D:
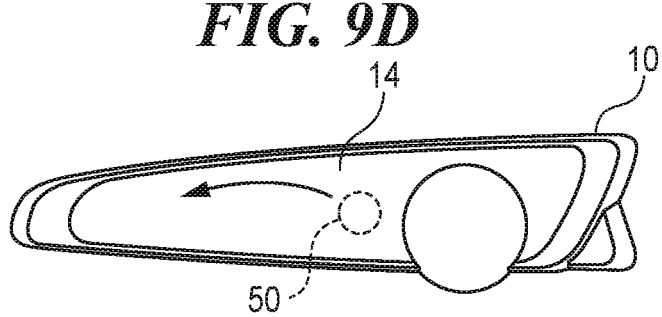

It should be noted that, even when the lighting of the turn signal is assigned to the operation of the lever switch 20 for a vehicle, the light spot 50 that represents the lighting of the turn signal in an abstract manner may not be displayed only on the video display 24 of the lever switch 20 for a vehicle. For example, when the driver pushes up the lever switch 20 for a vehicle when turning right, the light spot 50 may be displayed on the video display 14 of the right lever switch 10 for a vehicle. Specifically, as shown in FIGS. 8A to 8D, the video display 14 lights up the light spot 50 near the left end of the video display 14 (FIG. 8A), and then moves the light spot 50 from left to the right which is the turn direction of the vehicle as time proceeds (FIGS. 8B and 8C). Thereafter, when the light spot 50 reaches near the right end of the video display 14 (FIG. 8D), the light spot 50 is once turned off, and the light spot 50 is again lighted near the left end of the video display 14, and then the operations of FIGS. 8A to 8D are repeated over the predetermined time. On the other hand, when the driver pushes down the lever switch 20 for a vehicle when turning left, as shown in FIGS. 7A to 7D, the movement of the light spot 50 from right to left is displayed on the video display 24 of the lever switch 20 for a vehicle.

As a result, the movement of the light spot 50 is displayed on the video displays 14 and 24 of the lever switches 10 and 20 for a vehicle corresponding to the turn direction of the vehicle, such that the driver is able to easily notice which side of the light is on between right and left.

FIGS. 9A to 9D are diagrams indicating the displayed object on the video display 14 in the case where the right lever switch 10 for a vehicle in FIG. 1 is pushed to perform the reciprocating motion of the wipers.

In FIGS. 9A to 9D, when the driver pushes up the lever switch 10 for a vehicle and swings the lever switch 10 for a vehicle to a predetermined moderation feeling generated position, the video display 14 lights up the light spot 50 near the left end of the video display 14 and then moves the light spot 50 to near the right end thereof (FIG. 9A), and then moves the light spot 50 near the right end of the video display 14 to near the left end thereof (FIG. 9B), and moves the light spot 50 near the left end of the video display 14 to near the right end thereof again (FIG. 9C), and then moves the light spot 50 near the right end of the video display 14 to near the left end thereof (FIG. 9D), and then the operations of FIGS. 9A to 9D are repeated over a predetermined time. That is, the video display 14 displays the reciprocating movement of the light spot 50 along the X direction over a predetermined time. It should be noted that, when the lever switch 10 for a vehicle stays at a predetermined moderation feeling generated position, the reciprocating movement of the light spot 50 of FIGS. 9A to 9D is repeated continuously. On the other hand, when the lever switch 10 for a vehicle swings upward by a small amount, the reciprocating movement of the light spot 50 in FIGS. 9A to 9D is repeated a few times, for example, three times, and then the video display 14 ends the lighting of the light spot 50.

According to the present embodiment, since the light spot 50 reciprocates on the video display 14, the movement of the light spot 50 represents the reciprocating motion of the wipers in an abstract manner. Therefore, by visually observing the movement of the light spot 50, the driver can easily notice that the wipers are operating reciprocatively. As a result, even when the video display 14 displays (lights up) the light spot 50, the driver is not confused, understanding that the wipers are reciprocating, such that it enables to grasp the function that the driver is demonstrating without causing any troubles in driving.

It should be noted that, when the light spot 50 reciprocates on the video display 14, it is preferable that the light spot 50 does not move linearly along the X direction, but, for example, reciprocates upward in the form of a bow. Since the wipers reciprocates upward on a windshield in the form of the bow, the driver easily understands that the reciprocating movement of the light spot 50 represents the reciprocating motion of the wipers in an abstract manner.

In addition, it is preferable to adjust the speed and frequency of the reciprocating movement of the light spot 50 in accordance with the speed and the frequency of the reciprocating motion of the wipers. Accordingly, based on the reciprocation of the light spot 50, the driver easily understands not only that the wipers are reciprocating but also in what mode (high-speed mode, low-speed mode, intermittent mode and the like) they are operating.

In addition, not only the light spot 50 but also other objects may be displayed on the video displays 14 and 24 of the lever switches 10 and 20 for a vehicle. For example, in the case where an obstacle detecting function as well as the lighting of the turn signal is assigned to the operation of the lever switch 20 for a vehicle and the lever switch 20 for a vehicle operates when turning right or left, when an obstacle which is likely to collide, for example, other vehicle is detected in the turn direction of the vehicle, the approach of other vehicle may be displayed in an abstract manner.

Figure 10A:
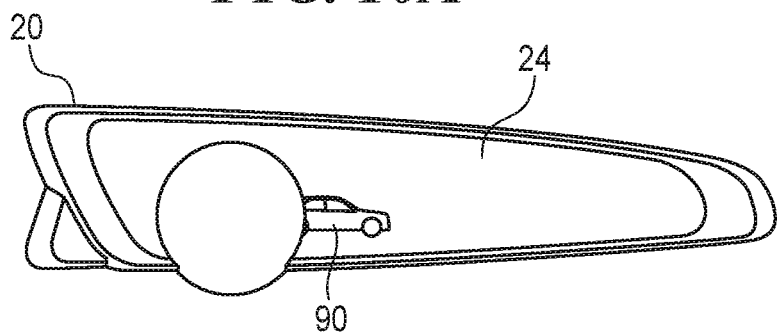
FIGS. 10A to 10C are diagrams indicating the displayed object on the video display in the case where other vehicle that is likely to collide with the left side of the vehicle is detected when turning left.
Figure 10B:
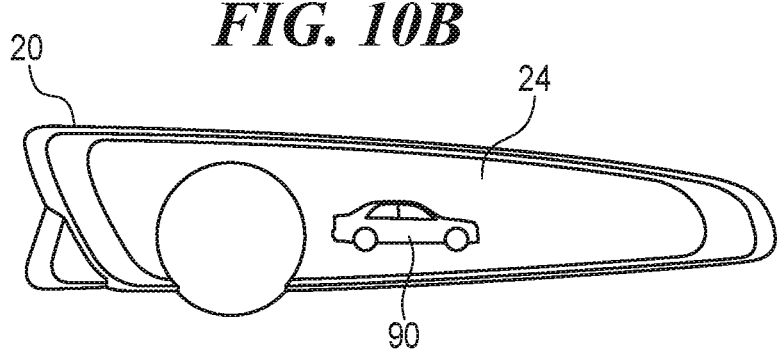
Figure 10C:
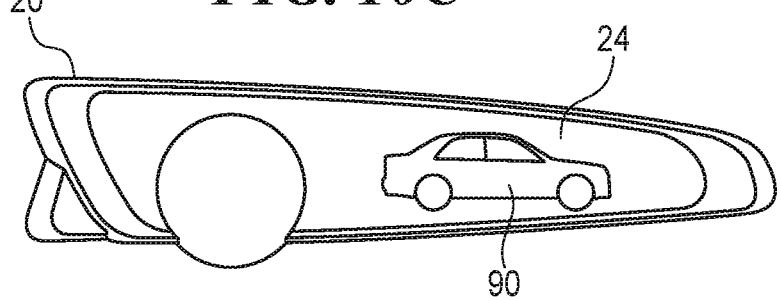

FIGS. 10A to 10C are diagrams indicating the displayed object on the video display 24 in the case where another vehicle that is likely to collide with the left side of the vehicle is detected when turning left.

In FIGS. 10A to 10C, in the case where the driver pushes down the lever switch 20 for a vehicle when turning left, when other vehicle which is likely to collide with the left side of the vehicle is detected, the video display 24 displays a symbol 90 imitating the vehicle near the left end of the video display 24 (FIG. 10A), and then moves the symbol 90 from left to right as time proceeds (FIG. 10B Thereafter, when the symbol 90 reaches near the right end of the video display 24 (FIG. 10C), the symbol 90 is once turned off, it is again displayed near the left end of the video display 24, and then the actions of FIGS. 10A to 10C are repeated over the predetermined time. In this case, the symbol 90 is enlarged following the movement of the symbol 90 from left to right. It should be noted that, when the lever switch 20 for a vehicle stays at a predetermined moderation feeling generated position, the movement of the symbol 90 of FIGS. 10A to 10C is repeated continuously. On the other hand, when the lever switch 20 for a vehicle swings downward by a small amount, the movement of the symbol 90 in FIGS. 10A to 10C is repeated a few times, and then the video display 24 ends the display of the symbol 90.

It should be noted that, in the case where the driver pushes up the lever switch 20 for a vehicle when turning right, when other vehicle which is likely to collide with the right side of the vehicle is detected, the video display 24 displays the movement of the symbol 90 from right to left. In addition, even at this time, the number of movements of the symbol 90 is determined according to the operation content of the lever switch 20 for a vehicle, and the symbol 90 is enlarged according to the movement of the symbol 90 from right to left.

According to the present embodiment, when other vehicle which is likely to collide with the left side of the vehicle is detected, the video display 24 displays the symbol 90 moving from left to right, and when other vehicle which is likely to collide with the right side of the vehicle is detected, the video display 24 displays the symbol 90 from right to left. In addition, when other vehicle is detected on the left side, the video display 24 enlarges the symbol 90 following the movement of the symbol 90 from left to right, and when other vehicle is detected on the right side, the video display 24 enlarges the symbol 90 following the movement of the symbol 90 from right to left. That is, the video display 24 represents the approach of other vehicle existing in the turn direction of the vehicle in an abstract manner according to the movement of the symbol 90. Therefore, by visually observing the movement of the symbol 90, the driver can easily notice that other vehicle is approaching.

It should be noted that the movement of the symbol 90 may not be displayed only on the video display 24 of the lever switch 20 for a vehicle. For example, in the case where the driver pushes up the lever switch 20 for a vehicle when turning right, when other vehicle which is likely to collide with the right side of the vehicle is detected, the video display 14 of the right lever switch 10 for a vehicle displays the movement of the symbol 90 from right to left.

Therefore, by displaying the movement of the symbol 90 on the video displays 14 and 24 of the lever switches 10 and 20 for a vehicle corresponding to the turn direction of the vehicle, it makes much easier for the driver to notice the existence of other vehicle which is likely to collide in the turn direction of the vehicle.

In addition, in the case where a detecting function of a road sign approach as well as the lighting of the turn signal are assigned to the operation of the lever switch 20 for a vehicle which is operated when turning right or left, the approach of the detected road sign may be displayed in an abstract manner when detecting the approach of the road sign in the turn direction of the vehicle.

Figure 11A:
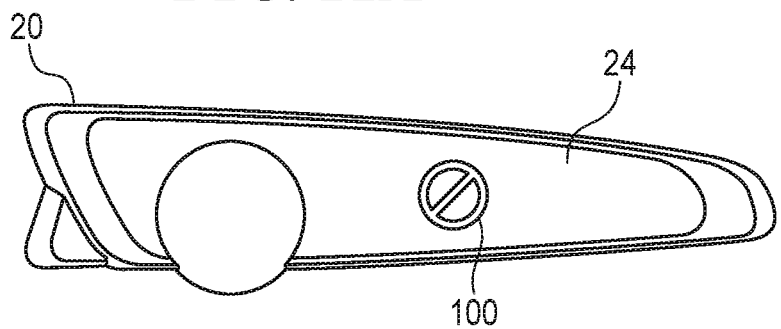
FIGS. 11A to 11C are diagrams indicating the displayed object on the video display in the case where a road sign is detected in a turning direction of the vehicle when turning left or left.
Figure 11B:
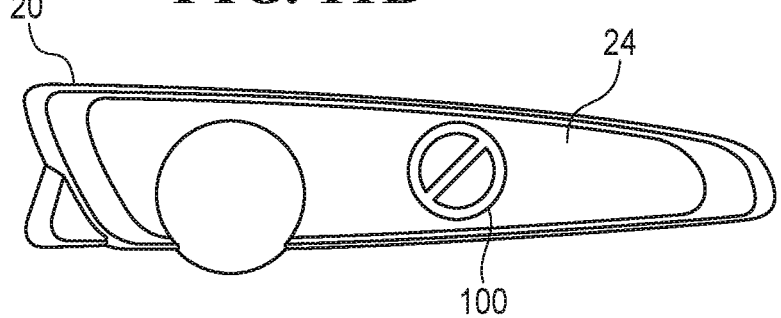
Figure 11C:
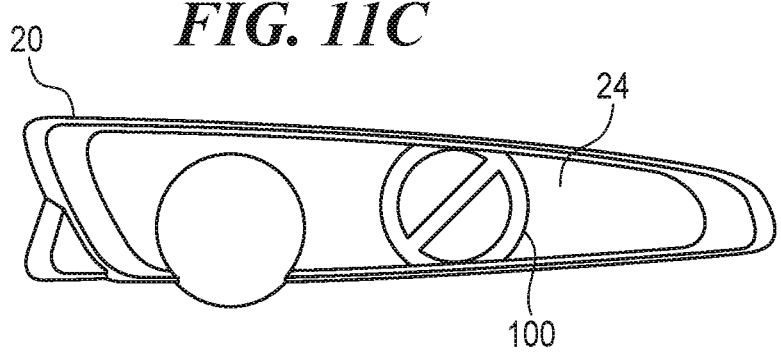

FIGS. 11A to 11C are diagrams indicating the displayed object on the video display 24 in the case where the road sign is detected in the turn direction of the vehicle when turning right or left.

In FIGS. 11A to 11C, in the case where the driver pushes up or down the lever switch 20 for a vehicle when turning right or left, when the road sign is detected in the turn direction of the vehicle, the video display 24 shrinks and displays the road sign, for example, a symbol 100 imitating a no-entry sign near the center of the video display 24 (FIG. 11A), and then enlarges the symbol 100 as time proceeds (FIG. 11B Thereafter, when the symbol 100 is enlarged to a predetermined size of the video display 24 (FIG. 11C), the symbol 100 is once turned off, the shrunk symbol 100 is again displayed near the center of the video display 24, and then the enlarged display of FIGS. 11A to 11C is repeated over the predetermined time. It should be noted that, when the lever switch 20 for a vehicle stays at a predetermined moderation feeling generated position, display enlargement of the symbol 100 of FIGS. 11A to 11C is continuously repeated. On the other hand, when the lever switch 20 for a vehicle swings upward by a small amount, display enlargement of the symbol 100 in FIGS. 11A to 11C is repeated a few times, and then the video display 24 ends display enlargement of the symbol 100.

According to the present embodiment, when the road sign is detected in the turn direction of the vehicle, the video display 24 enlarges and displays the symbol 100 imitating the road sign. That is, the video display 24 represents the approach of the road sign existing in the turn direction of the vehicle in an abstract manner by display enlargement of the symbol 100. Therefore, by visually observing the enlarged display of the symbol 100, the driver can easily notice that the road sign is approaching.

It should be noted that display enlargement of the symbol 100 may not be displayed only on the video display 24 of the lever switch 20 for a vehicle. For example, in the case where the driver pushes up the lever switch 20 for a vehicle when turning right, when the road sign is detected on the right side of the vehicle, the video display 14 of the right lever switch 10 for a vehicle may enlarge and display the symbol 100. It should be noted that, in this case, when the road sign is detected on the left side of the vehicle, the video display 24 of the lever switch 20 for a vehicle enlarges and displays the symbol 100.

Therefore, because the symbol 100 is enlarged and displayed on the video display 14 or 24 of the lever switch 10 or 20 for a vehicle corresponding to the turn direction of the vehicle, it makes much easier for the driver to notice the existence of the road sign in the turn direction of the vehicle.

According to the present embodiment, in the lever switch 10 for a vehicle and the lever switch 20 for a vehicle operated by the driver to demonstrate the desired function in the vehicle, the function instructed to be demonstrated is represented in an abstract manner. Accordingly, the driver intuitively notices the function being demonstrated, and does not require to pay attention to understand the function being demonstrated. As a result, it enables to prevent the driver from causing any troubles in driving.

In addition, in the present embodiment, the video display 14 of the lever switch 10 for a vehicle or the video display 24 of the lever switch 20 for a vehicle is inside of the steering wheel 31, and is disposed not to cover the object displayed on the instrument panel 32, for example, the speedometer 33 or the tachometer 34, and other warning lights (not shown). Therefore, during normal driving, the video display 14 or the video display 24 is positioned near the outer edge of the driver's sight, and as a result, it enables to prevent the driver from causing any troubles in driving while not drawing his/her attention.

In particular, in the case where the lever switches 10 and 20 for a vehicle perform the momentary action, when the driver's hand is released from those switches, they return to its initial position which is the position where the object displayed on the instrument panel 32 is not covered by the video displays 14 and 24. That is, the duration (or time length) in which the video displays 14 and 24 are positioned near the outer edge of the sight can be extended as long as possible, and as a result, the video displays 14 and 24 can keep transmitting information, for example, the instructed content of the function to the driver without drawing the his/her attention.

In addition, in the present embodiment, since most of the functions instructed to be demonstrated by the lever switch 10 for a vehicle or the lever switch 20 for a vehicle are the operations related to the X direction such as the turn of the vehicle or the reciprocating motion of the wipers, the video display 14 or the video display 24 formed horizontally long along the X direction can preferably display the functions being demonstrated.

As described above, although the preferable embodiment of the present invention was described, the present invention is not limited to the embodiment described above, but can be variously modified and changed without departing from the scope of the present invention.

For example, in the present embodiment, although the function corresponding to the swing in a vertical direction of the lever switch 10 or 20 for a vehicle is displayed on the video display 14 or display 24 in an abstract manner, when the lever switch includes operation knob, the function corresponding to the rotation of the operation knob may be displayed on the video display 14 or display 24 in an abstract manner.

In addition, in the present embodiment, the functions assigned to the lever switches 10 and 20 for a vehicle are represented by the movement of the light spot 50 or the movement of the symbols 90 and 100, however, the method of representing the functions being demonstrated is not limited thereto, and for example, the functions being demonstrated may be represented by flashing of the video displays 14 and 24, a luminosity change, or color variation.

In addition, the functions assigned to the lever switches 10 and 20 for a vehicle are not limited to the lighting of the turn signal, the reciprocating motion of the wipers, and the detecting function of obstacles or the detecting function of the sign approach, but also other functions, for example, the cruise control function may be assigned to the lever switch 10 and 20 for a vehicle.

Figure 12:
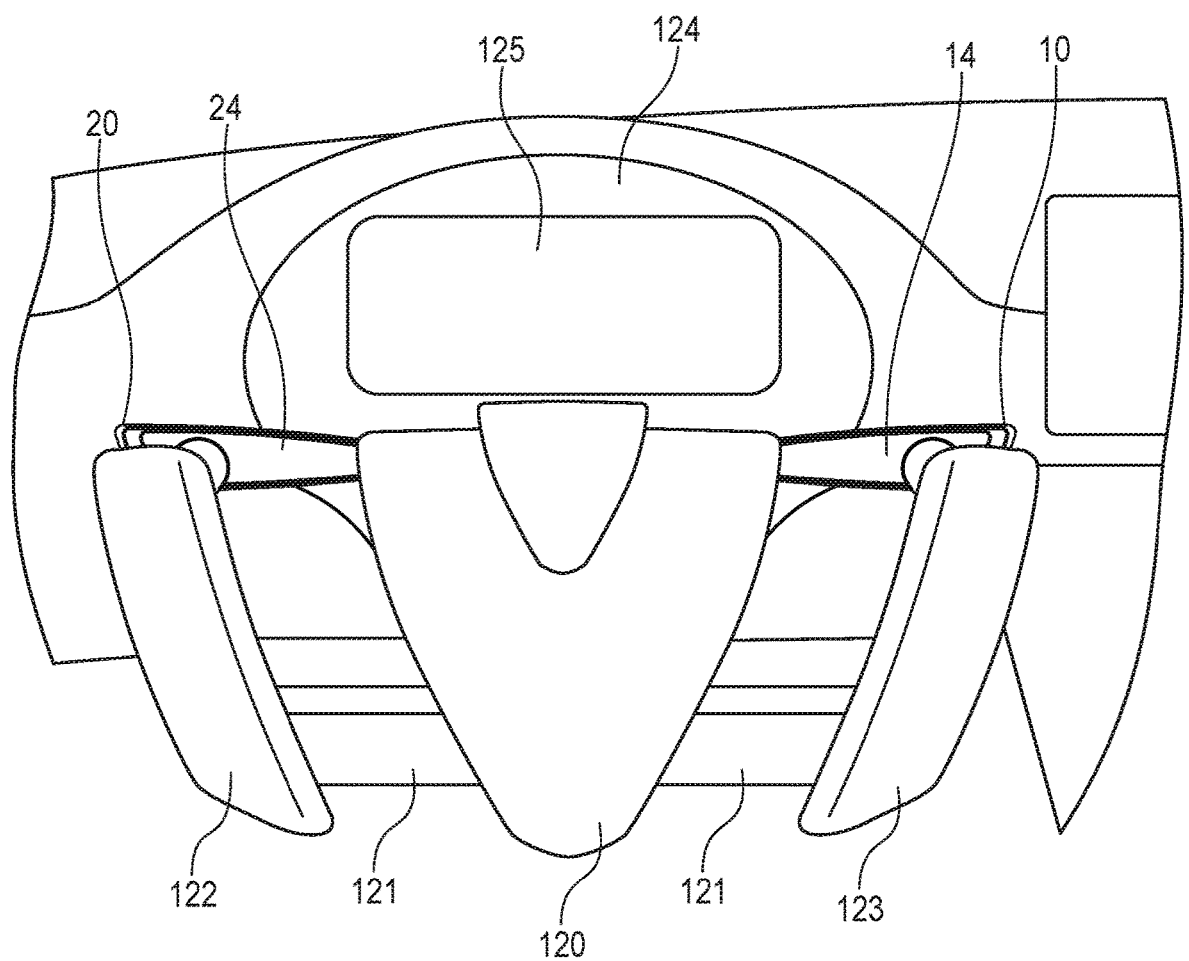
FIG. 12 is a diagram showing an arrangement form of the lever switch for a vehicle of FIG. 1 and the lever switch for a vehicle of FIG. 2 in a modification of a steering operation system.

In addition, the steering operation system may include grip bars 122 and 123 provided at the ends of the steering spoke 121 projecting leftward and rightward from the steering column 120 as shown in FIG. 12, instead of a circular steering wheel. In this case, the video display 14 is disposed so as not to cover the information display 125 of the instrument panel 124, and part of the video display 14 is covered by the grip bar 122. Further, the video display 24 is also disposed so as not to cover the information display 125 as on the video display 14, and part of the video display 24 is covered by the grip bar 123. Even in this case, since the video display 14 or display 24 are positioned near the outer edge of the driver's sight, it enables to transmit the information, for example, the instructed function to the driver without drawing his/her attention.

This application claims the benefit of Japanese Patent Application No. 2018-109774 filed on Jun. 7, 2018 which is hereby incorporated by reference herein in its entirety.

What is claimed is:

1. A lever switch for a vehicle mounted on a steering column of the vehicle, comprising:
   a main body; and
   a lever connected between the main body and the steering column,
   wherein the main body accepts an operation, and
   the main body has a display which displays that a function assigned to the operation is performed by varying at least one of a movement and a form of an object which is displayed on the display.

2. The lever switch for a vehicle according to claim 1, wherein the main body and the lever are integrated to accept the operation.

3. The lever switch for a vehicle according to claim 1, wherein the operation is a swing operation.

4. The lever switch for a vehicle according to claim 1, wherein a display surface of the display is exposed at a driver side of the main body.

5. The lever switch for a vehicle according to claim 1, wherein a display surface of the display is covered with a thin film on a surface of a driver side of the main body.

6. The lever switch for a vehicle according to claim 1, wherein the function assigned to the operation is lighting of a turn signal, and
the displayed object, at least one of the movement and the form of which is being varied, is a light moving in a turn direction of the vehicle.

7. The lever switch for a vehicle according to claim 1, wherein the function assigned to the operation is a detection of an obstacle, and
the displayed object, at least one of the movement and the form of which is being varied, is a symbol of an obstacle approaching the vehicle.

8. The lever switch for a vehicle according to claim 1, wherein the function assigned to the operation is a detection of a road sign, and
the displayed object, at least one of the movement and the form of which is being varied, is a symbol of the road sign approaching the vehicle.

9. The lever switch for a vehicle according to claim 1, wherein when viewed from the driver, the display is inside of a steering wheel, and is disposed so as not to cover an object displayed on an instrument panel.

10. The lever switch for a vehicle according to claim 1, wherein when viewed from the driver, part of the display is covered with a grip bar, and the display is disposed so as not to cover an object displayed on an instrument panel.

11. The lever switch for a vehicle according to claim 1, wherein the main body at least performs a momentary action of making the main body return to its initial position after the operation.

12. The lever switch for a vehicle according to claim 1, wherein the display is extended along a horizontal direction of the vehicle.

13. The lever switch for a vehicle according to claim 12, wherein the function assigned to the operation is a reciprocating motion of wipers, and
the displayed object, at least one of the movement and the form of which is being varied, is a light reciprocating with respect to a left and right direction of the display.

14. A steering column of a vehicle comprising:
at least one lever switch mounted on the steering column;
wherein the at least one lever switch includes:
a main body; and
a lever connected between the main body and the steering column,
wherein the main body accepts an operation, and
the main body has a display which displays that a function assigned to the operation is performed by varying at least one of a movement and a form of an object which is displayed on the display.

15. The steering column of a vehicle according to claim 14, wherein the at least one lever switch includes two lever switches, one being attached to the right side of the steering column and the other being attached to the left side of the steering column, and wherein depending on a turn direction of the vehicle, it is determined on which of the two lever switches the object is to be displayed, and wherein at least one of the movement and the form of the displayed object is varied.

* * * * *